(12) United States Patent
Suzuki et al.

(10) Patent No.: US 8,553,563 B2
(45) Date of Patent: Oct. 8, 2013

(54) METHODS AND APPARATUS TO LIMIT REPORTING OF NEIGHBOR CELL MEASUREMENTS

(75) Inventors: Takashi Suzuki, Ichikawa (JP); Zhijun Cai, Euless, TX (US); Jun Li, Richardson, TX (US); Dinesh Kumar Arora, Kitchener (CA)

(73) Assignee: BlackBerry Limited, Waterloo (CA)

( * ) Notice: Subject to any disclaimer, the term of this patent is extended or adjusted under 35 U.S.C. 154(b) by 319 days.

(21) Appl. No.: 12/856,344

(22) Filed: Aug. 13, 2010

(65) Prior Publication Data

US 2012/0039189 A1    Feb. 16, 2012

(51) Int. Cl.
*H04J 1/16* (2006.01)
(52) U.S. Cl.
USPC ............. 370/241; 370/252; 370/345
(58) Field of Classification Search
USPC ............. 370/241.1, 241, 345, 252
See application file for complete search history.

(56) References Cited

U.S. PATENT DOCUMENTS

| | | | | |
|---|---|---|---|---|
| 6,116,005 A * | 9/2000 | Chamberlain | ............ | 56/10.2 G |
| 6,219,544 B1 | 4/2001 | Suutarinen | | |
| 6,360,098 B1 * | 3/2002 | Ganesh et al. | ............ | 455/436 |
| 7,092,711 B2 * | 8/2006 | Masuda et al. | ............ | 455/439 |
| 7,706,135 B2 | 4/2010 | Sharp et al. | | |
| 7,929,512 B2 * | 4/2011 | Malomsoky et al. | ......... | 370/345 |
| 7,979,208 B2 | 7/2011 | Wang | | |
| 8,121,602 B2 | 2/2012 | Yi et al. | | |
| 8,155,659 B2 | 4/2012 | Kazmi et al. | | |
| 8,219,127 B2 * | 7/2012 | Lee et al. | ............ | 455/466 |
| 2003/0190916 A1 * | 10/2003 | Celedon et al. | ............ | 455/437 |
| 2004/0032845 A1 * | 2/2004 | Chen | ............ | 370/338 |
| 2006/0264179 A1 | 11/2006 | Bonneville et al. | | |
| 2008/0108374 A1 | 5/2008 | Xiong et al. | | |
| 2008/0188216 A1 * | 8/2008 | Kuo et al. | ............ | 455/424 |
| 2010/0052985 A1 | 3/2010 | Hung et al. | | |
| 2010/0081438 A1 * | 4/2010 | Callender et al. | ............ | 455/436 |
| 2010/0190488 A1 | 7/2010 | Jung et al. | | |
| 2010/0208707 A1 | 8/2010 | Hamabe et al. | | |
| 2010/0273472 A1 * | 10/2010 | Drewes et al. | ............ | 455/423 |

(Continued)

FOREIGN PATENT DOCUMENTS

| | | |
|---|---|---|
| EP | 2360961 A2 | 8/2011 |
| EP | 2360961 A3 | 11/2011 |

(Continued)

OTHER PUBLICATIONS

International Searching Authority, "Search Report," issued in connection with corresponding PCT Application No. PCT/CA2011/050078, mailed on Mar. 17, 2011, (3 pages).

(Continued)

*Primary Examiner* — Ricky Ngo
*Assistant Examiner* — Dewanda Samuel
(74) *Attorney, Agent, or Firm* — Hanley, Flight & Zimmerman, LLC (57) ABSTRACT

Methods and apparatus to limit reporting of neighbor cell measurements are disclosed. An example method disclosed herein for a wireless device to perform measurements in a mobile communication network comprises receiving configuration information for periodic downlink pilot measurements to be performed by the wireless device, the configuration information including an upper limit on a number of neighbor cells for which periodic downlink pilot measurements are permitted to be reported, and performing the periodic downlink pilot measurements in accordance with the configuration information.

11 Claims, 6 Drawing Sheets

(56) References Cited

U.S. PATENT DOCUMENTS

| | | |
|---|---|---|
| 2010/0330921 A1 | 12/2010 | Kim et al. |
| 2012/0008506 A1 | 1/2012 | Astigarraga et al. |
| 2012/0039365 A1 | 2/2012 | Suzuki et al. |
| 2012/0044822 A1* | 2/2012 | Kim et al. .................. 370/252 |

FOREIGN PATENT DOCUMENTS

| | | |
|---|---|---|
| WO | 0070897 | 11/2000 |
| WO | 02082120 | 10/2002 |
| WO | 2008083618 | 7/2008 |
| WO | 2009056028 | 5/2009 |

OTHER PUBLICATIONS

International Searching Authority, "Written Opinion," issued in connection with corresponding PCT Application No. PCT/CA2011/050078, mailed on Mar. 17, 2011, (4 pages).

International Searching Authority, "Search Report," issued in connection with corresponding PCT Application No. PCT/CA2011/050079, mailed on Mar. 14, 2011, (3 pages).

International Searching Authority, "Written Opinion," issued in connection with corresponding PCT Application No. PCT/CA2011/050079, mailed on Mar. 14, 2011, (4 pages).

International Searching Authority, "Search Report," issued in connection with corresponding PCT Application No. PCT/CA2011/050080, mailed on Apr. 29, 2011, (3 pages).

International Searching Authority, "Written Opinion" issued in connection with corresponding PCT Application No. PCT/CA2011/050080, mailed on Apr. 29, 2011, (4 pages).

"3rd Generation Partnership Project; Technical Specification Group Radio Access Network; User Equipment (UE) procedures in idle mode and procedures for cell reselection in connected mode (Release 8)," 3GPP TS 25.304 V8.10.0, Jun. 2010, (50 pages).

"3rd Generation Partnership Project; Technical Specification Group Radio Access Network; Evolved Universal Terrestrial Radio Access (E-UTRA); User Equipment (UE) procedures in idle mode (Release 8)," 3GPP TS 36.304 V8.8.0, Dec. 2009, (30 pages).

"Support of UE-originated RLFreporting for Mobility Robustness Son use case," Change Request 36.331, CR 0401, rev 3, Current Version: 9.1.0, 3GPP TSG-WG2 Meeting #69, San Francisco, USA, Feb. 22-26, 2010, (7 pages).

NTT Docomo, Inc. "Positioning session as trigger for MDT measurement collection," Document for Discussion and Approval, Agenda Item: 4.3.1.3 (4.3.1.2), 3GPP TSG-RAN2#70bis; Stockholm, Sweden, Jun. 28-Jul. 2, 2010 (4 pages).

"3rd Generation Partnership Project; Technical Specification Group TSG Ran; Universal Terrestrial Radio Access (UTRA) and Evolved Universal Terrestrial Radio Access (E-UTRA); Radio measurement collection for Minimization of Drive Tests (MDT); Overall description; Stage 2; (Release 10)," Jun. 2010, (15 pages).

Surveylab, "GPS TIFF and startup modes," downloaded from http://www.ikegps.com/ on Aug. 13, 2010 (3 pages).

International Searching Authority, "International Search Report and Written Opinion," issued in connection with corresponding PCT Application No. PCT/US2011/047243, issued on Dec. 2, 2011 (12 pages).

International Searching Authority, "International Search Report and Written Opinion," issued in connection with corresponding PCT Application No. PCT/US2011/047244, issued on Nov. 16, 2011 (14 pages).

Research in Motion UK Limited, "Reporting of Neighbour Cell in Logged MDT," Document for Discussion and Decision, Agenda Item: 4.3.1.3, 3GPP TSG-RAN WG2 Meeting #71bis; Xi'an, China, Oct. 11-15, 2010 (3 pages).

ETSI MCC, "Report of 3GPP TSG RAN WG2 Meeting #71bis, held in Xi'an, China, Oct. 11-15, 2010," Document for Approval, Agenda Item: 2.2, 3GPP TSG-RAN Working Group 2 Meeting #72; Jacksonville, USA, Nov. 15-19, 2010 (144 pages).

"3rd Generation Partnership Project; Technical Specification Group Radio Access Network; Study on Minimization of Drive-Tests in Next Generation Networks (Release 9)," 3GPP TS 36.805 V2.0.0, Nov. 2009, (23 pages).

"3rd Generation Partnership Project; Technical Specification Group Radio Access Network; Study on Minimization of Drive-Tests in Next Generation Networks (Release 9)," 3GPP TS 36.805 V2.0.0, Dec. 2009, (23 pages).

"3rd Generation Partnership Project; Technical Specification Group Radio Access Network; Universal Terrestrial Radio Access (UTRA) and Evolved Universal Terrestrial Radio Access (E-UTRA); Radio Measurement Collection for Minimization of Drive Tests (MDT); Overall Description; Stage 2 (Release 10)," 3GPP TS 37.320 V0.7.0, Jun. 2010 (14 pages).

"3rd Generation Partnership Project; Technical Specification Group Radio Access Network; Universal Mobile Telecommunications System (UMTS); LTE; Universal Terrestrial Radio Access (UTRA) and Evolved Universal Terrestrial Radio Access (E-UTRA); Radio Measurement Collection for Minimization of Drive Tests (MDT); Overall Description; Stage 2 (Release 10)," 3GPP TS 37.320 V10.2.0, Jul. 2011 (19 pages).

USPTO, "Office Action," issued in connection with U.S. Appl. No. 12/856,355, on Jan. 30, 2012 (10 pages).

USPTO, "Notice of Allowance," issued in connection with U.S. Appl. No. 12/856,355, on Jul. 12, 2012 (7 pages).

* cited by examiner

METHODS AND APPARATUS TO LIMIT REPORTING OF NEIGHBOR CELL MEASUREMENTS

FIELD OF THE DISCLOSURE

This disclosure relates generally to measurement reporting and, more particularly, to methods and apparatus to limit reporting of neighbor cell measurements.

BACKGROUND

Currently, mobile communication network operators perform drive tests, often continuously or at least frequently, to collect network performance metrics. The Third Generation Partnership Project (3GPP) has begun specifying a minimization of drive test (MDT) framework in which at least some drive test measurements can be collected from commercial user equipment (UE) operating in the network, instead of requiring dedicated drive tests. Through the use of the MDT framework, the need for and number of rigorous drive tests may be reduced, which could significantly decrease network maintenance costs for operators and also decrease carbon emissions, thereby helping to protect the environment. Additionally, by reducing reliance on separate drive tests, faster optimization cycles may be achieved, thereby resulting in higher customer satisfaction. Furthermore, the MDT framework may enable operators to collect measurements from areas that are typically not accessed during drive tests (e.g. such as narrow roads, forests, private land, homes and office, etc.).

DETAILED DESCRIPTION

Methods and apparatus to limit reporting of neighbor cell measurements are disclosed herein. An example method disclosed herein involves a UE receiving configuration information from a network element in a mobile communication network for configuring periodic downlink pilot measurements to be performed by the UE. Periodic downlink pilot measurements are one example of logged MDT measurements that can be performed by the UE during idle mode to enable coverage monitoring. The configuration information received by the UE from the network element includes an upper limit on a number of neighbor cells for which periodic downlink pilot measurements are permitted to be reported. The example method also involves the UE performing the periodic downlink pilot measurements in the mobile communication network in accordance with the configuration information.

In some examples, the upper limit included in the configuration information can correspond to a total number of neighbor cells for which periodic downlink pilot measurements are permitted to be reported. In some examples, the upper limit included in the configuration information can correspond to a maximum number of neighbor cells, in a specified absolute priority layer, for which periodic downlink pilot measurements are permitted to be reported. In some examples, the upper limit included in the configuration information is a first upper limit on a first number of neighbor cells, among all absolute priority layers having higher priority than an absolute priority layer of a serving cell of the UE, for which periodic downlink pilot measurements are permitted to be reported. Additionally or alternatively, the configuration information can include a second upper limit on a second number of neighbor cells, among all absolute priority layers having lower priority than the absolute priority layer of the serving cell of the UE, for which periodic downlink pilot measurements are permitted to be reported. Additionally or alternatively, the configuration information can include a third upper limit on a third number of neighbor cells, among all absolute priority layers having priority equal to the absolute priority layer of the serving cell of the UE, for which periodic downlink pilot measurements are permitted to be reported. The absolute priority of different frequencies and/or RATs to which the neighbor cells belong can be specified in the received configuration information or obtained separately, such as via other information signaled by the network to the UE to configure cell reselection.

At least some of the example methods and apparatus described herein can provide substantial benefits over prior logged MDT measurement techniques proposed for inclusion in the MDT framework. The MDT framework supports immediate MDT measurements and logged MDT measurements. Similar to measurement reporting performed during normal UE operation, immediate MDT measurements are triggered by the network during connected mode, and cause the UE to reply with the requested MDT measurements. In contrast, logged MDT measurements correspond to MDT measurements performed by a UE during idle mode when the UE does not have access to radio resources to transmit MDT measurement reports to the network. For logged MDT measurements, MDT measurements to be performed by the UE are configured by the network during connected mode. The UE later performs the configured MDT measurements (e.g., based on configured activation criteria) during idle mode, and stores the MDT measurements until the UE later enters connected mode, has access to radio resources and can report the logged MDT measurements to the network.

Unlike prior proposed techniques for logged MDT measurements, at least some of the example methods and apparatus disclosed herein enable configuration of one or more limits on the number of neighbor cells for which MDT measurements, such as periodic downlink pilot measurements, are to be logged and reported. Such limits can reduce the size of the measurement log files stored in the UE, thereby reducing UE memory consumption, and also reduce the consumption of radio resources needed by the UE to report the measurement log files to the network. At least some of the example methods and apparatus disclosed herein also enable configuration of neighbor cell reporting limits for neighbor cells associated with specified absolute priority layers. Absolute priority layers were introduced in Release 8 of the 3GPP standard and are used by the network to specify frequency and radio access technology (RAT) priorities for cell reselection. In networks supporting absolute priority layers, each frequency or group of frequencies, and/or each RAT, can be a layer for which an absolute priority is specified. Unlike prior proposed techniques for logged MDT measurements, at least some of the example methods and apparatus disclosed herein enable configuration of neighbor cell reporting limits for neighbor cells having a particular specified absolute priority (e.g., based on the neighbor cell's frequency and/or RAT) and/or having absolute priorities in a specified range relative to (e.g., greater than, less than or equal to) the absolute priority of a UE's serving cell. At least some of the example methods and apparatus disclosed herein also enable offsets to be configured to adjust the MDT measurements of specified neighbor cells to bias their inclusion in the MDT measurement logs when constrained by one or more configured limits on the number of neighbor cells for which MDT measurements are to be logged and reported.

Figure 1:
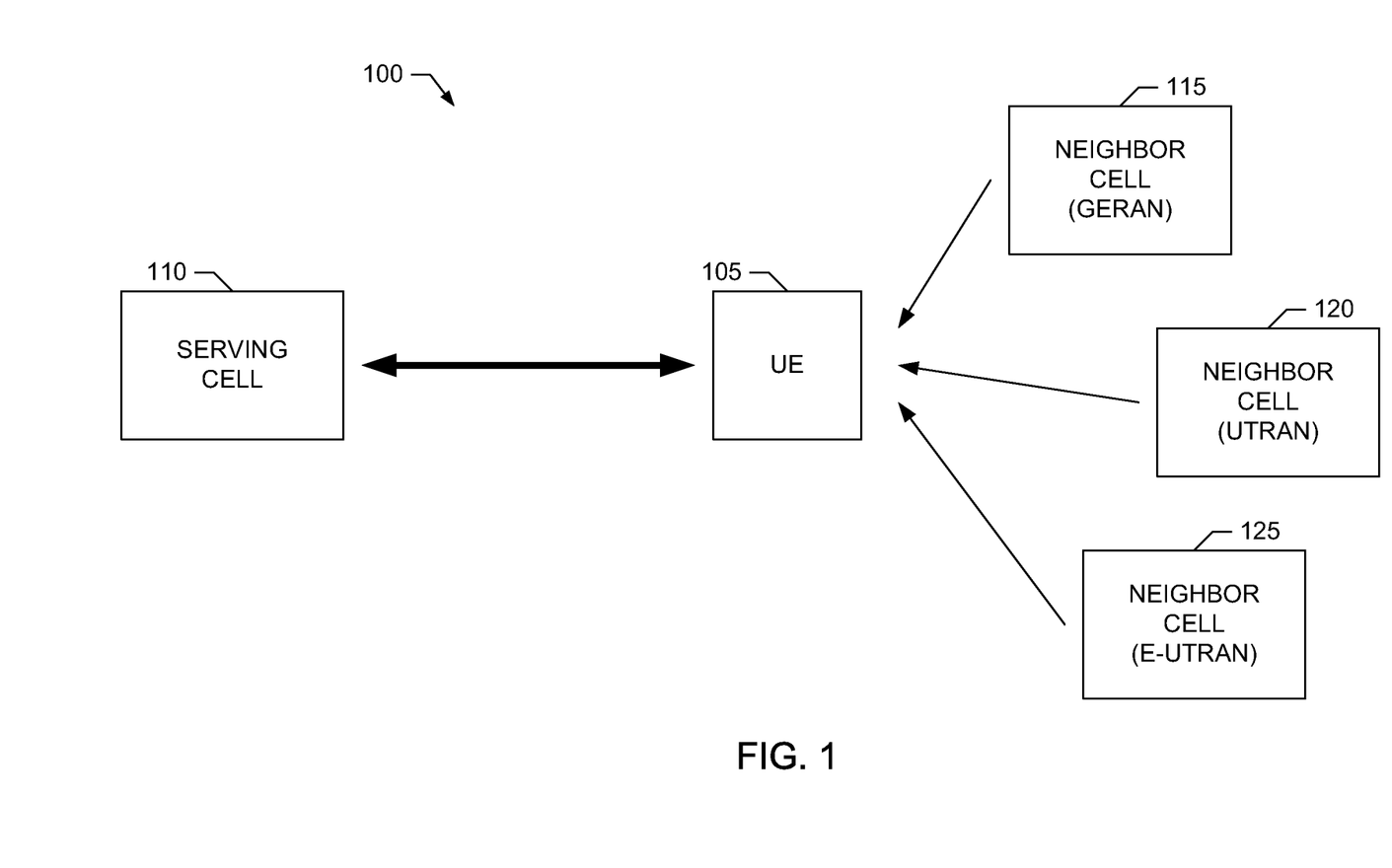
FIG. 1 is a block diagram of an example 3GPP communication system capable of supporting the methods and apparatus described herein to limit reporting of MDT neighbor cell measurements.

Turning to the figures, a block diagram of an example next-generation 3GPP communication system 100 capable of supporting the MDT measurement techniques described herein is illustrated in FIG. 1. The communication system 100 includes an example UE 105 served by an example current (or home or serving) cell 110 implemented by a network element providing base station functionality, such as a node-B in a universal terrestrial radio access network (UTRAN) implementation, an evolved node-B (eNB) in an evolved UTRAN (E-UTRAN) long term evolution (LTE) implementation, etc. Additionally, the communication system 100 includes example cells 115, 120 and 125, which are neighbor cells of the current cell 110. In the illustrated example, the neighbor cells 115, 120 and 125 are implemented by one or more network elements different from the network element implementing the current cell 110. As described in greater detail below, the mobile station 105 and the network element implementing the current cell 110 limit reporting of neighbor cell MDT measurements in accordance with the example methods and apparatus disclosed herein.

In the communication system 100, the UE 105 may correspond to any type of wireless device, mobile station, user endpoint equipment, user agent, etc., such as a mobile telephone device, a fixed telephone device, a personal digital assistant (PDA), a smartphone (e.g., such as BlackBerry® smartphone), etc. Each of the cells 110-125 may correspond to any type of cell, such as a GERAN cell, a UTRAN cell, an E-UTRAN cell, CDMA HRPD cell, CDMA 1xRTT cell, etc. (where GERAN refers to GSM/EDGE radio access network, GSM refers to global system for mobile communications, EDGE refers to enhanced data rates for GSM evolution, CDMA refers to code division multiple access, HRPD refers to high rate packet data and 1xRTT refers to 1× radio transmission technology as defined in the CDMA specifications). Moreover, some or all of the cells 110-125 may be the same or different types of cells. For example, in FIG. 1 the neighbor cell 115 is a GERAN cell, the neighbor cell 120 is a UTRAN cell and the neighbor cell 125 is an E-UTRAN cell. Also, although each of the cells 110-125 is depicted as being implemented by a separate network element providing base station functionality, some or all of the cells 115-125 may be implemented by a common network element. Furthermore, although only one UE 105 and four (4) cells 110-125 are illustrated in FIG. 1, the 3GPP communication system 100 can support any number of UEs 105 and cells 110-125.

In the illustrated example of FIG. 1, the UE 105 performs one or more MDT measurements as configured by the network element implementing the current cell 110. Examples of such MDT measurements include, but are not limited to, a periodic downlink pilot measurement, a serving cell becomes worse than threshold measurement, a transmit power headroom becomes less than threshold measurement, a random access failure measurement, and a radio link failure report, which are described in 3GPP Technical Report (TR) 36.805, V2.0.0 (December 2009), which is hereby incorporated by reference in its entirety. Briefly, for the periodic downlink pilot measurement, radio environment measurements, such as Common Pilot Channel (CPICH) Received Signal Code Power (RSCP), CPICH Ec/No, Time Division Duplex (TDD) Primary Common Control Physical Channel (P-CCPCH) RSCP and Interference Signal Code Power (ISCP), Reference Signal Received Power (RSRP) and Reference Signal Received Quality (RSRQ) (e.g., in connected mode only) are logged periodically in connected mode, idle mode, or both. The configuration information for periodic downlink pilot measurements includes the specified measurement period, and the periodic downlink pilot measurement reports include the radio environment measurements, as well as time and location information specifying when and where the measurement was taken, and cell identification information identifying the cell associated with a particular reported measurement. For the serving cell becomes worse than threshold measurement, radio environment measurements, such as those mentioned above, as well as location and cell identification information are logged when a measured serving cell metric becomes worse than the configured threshold. A measurement logging window (e.g., such as a "sliding window" in which collected logs are kept in the UE) is used to collect information during a certain period before and after the occurrence of event. For the transmit power headroom becomes less than threshold measurement, transmit power headroom and radio environment measurements, such as those mentioned above, as well as location and cell identification information are logged when UE transmit power headroom becomes less than the configured threshold. For the random access failure measurement, details on the random access and radio environment measurements, such as those mentioned above, as well as location and cell identification information are logged when a random access failure occurs. For the radio link failure report, radio environment measurements, such as those mentioned above, as well as location and cell identification information are reported when a radio link failure (RLF) occurs.

In an example implementation, the UE 105 is configured to perform periodic downlink pilot (PDP) measurements of the current cell 110 (also referred to as the serving cell 110) and one or more of the neighbor cells 115, 120 and 125 to enable configuration, verification, optimization, etc., of one or more parameters used by the communication system 100 to implement active priority layers for cell reselection. In Release 8 of the 3GPP specification, absolute priority was introduced to enable a network to specify frequency and radio access technology (RAT) priorities for cell reselection. For example, networks, such as the communication system 100, conforming to 3GPP Release 8 can specify the priorities of one or more inter-frequency layers and/or one or more inter-RAT layers in system information broadcast generally throughout a cell (e.g., the cell 110), and/or or in a dedicated message sent to a specific UE (e.g., the UE 105). Each such frequency or group of frequencies, and each such RAT, is considered to be a "layer" for which an absolute priority is specified. When the network specifies priorities for specified layers in a dedicated message, the priorities may be specific to the receiving UE, whereas priorities specified in the system information apply generally to all UEs served by the broadcasting cell.

In an example implementation of the communication system 100 supporting absolute priorities for cell reselection, the UE 105 selects a target cell from the set of neighbor cells 115-125 and belonging to a particular frequency and/or RAT layer in accordance with the absolute priority specified by the network. Various configuration parameters for measurement rules and cell reselection criteria are employed by the network to configure absolute priorities for cell reselection. The measurement rules, in conjunction with at least some of the configuration parameters, specify under what conditions a UE, such as the UE 105, is to measure neighbor cells on particular frequency and/or RAT layers. The cell reselection criteria, in conjunction with at least some of the configuration parameters, define how a UE, such as the UE 105, is to select a particular target cell for reselection among a set of neighbor cells on the evaluated frequency and/or RAT layers. Examples of configuration parameters for implementing absolute priorities for cell reselection in the communication system 100 include one or more absolute priority layers specified in terms of particular frequencies and/or RATs, one or more offsets to be applied to measurements for cells associated with one or more particular absolute priority layers, one or more thresholds associated with one or more particular absolute priority layers and to be used by the UE to determine whether to perform reselection to a neighbor cell associated with a particular absolute priority layer, one or more timers associated with one or more particular absolute priority layers and to be used by the UE to determine whether to perform reselection to a neighbor cell associated with a particular absolute priority layer, etc.

Configuration of parameters implementing absolute priority layers for cell reselection, such as those described above, is performed as a part of radio network planning to ensure that UEs reselect to and camp on cells belonging to frequency and/or RAT layers as intended by the network operator. Generally, the network operator may intend for UEs to perform cell reselection from lower absolute priority layers to higher absolute priority layers, or vice versa, at particular locations in the network. For example, in an initial E-UTRAN deployment in the communication system 100, E-UTRAN cells may be deployed in hot spots and these E-UTRAN layers may be given a higher absolute priority than co-located UTRAN layers. As the UE 105 approaches one of these hot spots, the network operator intends for the UE 105 to reselect to the E-UTRAN cell implementing the hot spot to enjoy higher communication data rates. However, if the cell reselection configuration parameters are not set properly, the UE 105 may stay in a co-located UTRAN cell longer than expected. If this occurs, the ability of the UE 105 to access the E-UTRAN service provided by the hot spot may be delayed. Conversely, as the UE 105 leaves the hot spot, the network operator may intend for the UE 105 to reselect to a co-located UTRAN cell. However, if the cell reselection configuration parameters are not set properly, the UE 105 may stay in the E-UTRAN cell longer than expected, potentially resulting in the UE 105 experiencing radio link failure or causing excessive interference in the E-UTRAN cell implementing the hot spot.

To enable configuration, verification, optimization, etc., of one or more parameters used by the communication system 100 to implement active priority layers for cell reselection, the communication system 100 configures one or more UEs, such as the UE 105, to perform logged MDT measurements, such as periodic downlink pilot measurements, of neighbor cells belonging to lower priority, higher priority and/or equal priority layers relative to the priority layer of the UE's serving cell (e.g., the serving cell 110). MDT measurement reports containing the logged MDT measurements for these neighbor cells can then be used to evaluate the correctness of the network parameters implementing active priority layers for cell reselection and to perform any adjustments of these parameters. Furthermore, the MDT configuration information provided by the network to the UE 105 to configure the periodic downlink pilot measurements (or, more generally, any other MDT measurements) to be performed for the neighbor cell(s) can specify one or more limits on the number of neighbor cells for which periodic downlink pilot measurements are to be logged and reported. For example, one such limit can specify a total number of neighbor cells, among all absolute priority layers, for which periodic downlink pilot measurements are permitted to be reported. Other example limits can each specify a maximum number of neighbor cells, in a specified absolute priority layer, for which periodic downlink pilot measurements are permitted to be reported. Additionally or alternatively, in some examples the MDT configuration information can include one or more of (1) a first upper limit to specify a first number of neighbor cells (e.g., NH), among all absolute priority layers having higher priority than an absolute priority layer of the serving cell 110 of the UE 105, for which periodic downlink pilot measurements are permitted to be reported; (2) a second upper limit on a second number of neighbor cells (e.g., NL), among all absolute priority layers having lower priority than the absolute priority layer of the serving cell 110 of the UE 105, for which periodic downlink pilot measurements are permitted to be reported; and/or (3) a third upper limit on a third number of neighbor cells (e.g., NE), among all absolute priority layers having priority equal to the absolute priority layer of the serving cell 110 of the UE 105, for which periodic downlink pilot measurements are permitted to be reported.

In some examples, the UE 105 ranks the periodic downlink pilot measurements for the evaluated neighbor cells (e.g., cells 115-125) and, based on the absolute priority of each of the neighbor cells, determines whether to store (e.g., log) the measurements for a particular cell based on the configured neighbor cell reporting limits. For example, after ranking neighbor cells belonging to a particular active priority layer (or range of active priority layers having higher, lower or equal priority relative to the priority of the serving cell 105), the UE 105 logs PDP measurements for the neighbor cells having the highest ranked measurements up to the limit(s) specified in the MDT configuration information. In some example heterogeneous deployments, the transmission power of macro cells is different (e.g., higher) than the transmission power of femto, pico and/or relay cells included in the network. To account for this transmission power difference when ranking PDP measurements, and because femto, pico and/or relay cells may have higher absolute priority than the co-located macro cells, the MDT configuration information can include one or more offsets to be applied to the PDP measurements of specified neighbor cells (e.g., specified by cell identification information and/or class or type of cell) prior to ranking and logging of the measurements.

In some examples, the MDT configuration information provided by the network to the UE 105 includes an indication (e.g., or flag, bit, etc.) specifying whether received signal strength indication (RSSI) is to be logged or measured when the UE 105 performs public land mobile network (PLMN) scanning RSSI is often used to detect a frequency of a PLMN because, unlike other quality measurements such as RSCP and RSRP, knowledge of the specific code sequence of a cell in a PLMN is not required to determine the cell's RSSI. However, under some circumstances, good RSSI may not correlate to good cell quality (e.g., measured using RSCP, RSRP, etc.), whereas under other circumstances RSSI and cell quality may be correlated. To enable a network operator to evaluate whether RSSI is correlated with neighbor cell quality in a particular deployment, the MDT configuration information provided by the network to the UE 105 can cause the UE 105 to perform RSSI measurements in addition to the other configured periodic downlink pilot measurements. For example, when the UE 105 camps on a suitable cell, the UE 105 may log measured RSSI values to detect the PLMN and the quality of the camped on cell. Alternatively when the UE performs PLMN scanning, a PLMN identity, a frequency, an RSSI measurement, a list of cell identities, a cell quality, etc., per detected PLMN may be logged.

The communication system 100 can employ one or more techniques for providing MDT configuration information to the UE 105. In one example, the serving cell 110 uses control plane signaling to send MDT configuration information to the UE 105. For example, in connected mode a radio resource control (RRC) connection exists between the UE 105 and the serving cell 110, and RRC messages, such as measurement control or reconfiguration messages, can be used to send the MDT configuration information from the network to the UE 105. Additionally or alternatively, the serving cell 110 can use user plane signaling to send MDT configuration information to the UE 105. For example, dynamic over-the-air configuration using one or more short message service (SMS) messages, one or more emails, one or more BlackBerry® personal identification number (PIN) messages, etc., can be used to send the MDT configuration information from the network to the UE 105. For the case of logged MDT measurements, such as the periodic downlink pilot measurements, the MDT measurement configuration persists after the UE 105 leaves connected mode and enters idle mode, which enables to the UE 105 to perform the MDT measurements during idle mode and later report the logged measurements when the UE 105 re-enters the connected state and establishes a radio connection with its serving cell (e.g., the serving cell 110). Similar to the different techniques for sending MDT configuration information to the UE 105, the UE 105 can use control plane signaling (e.g., RRC messages) and/or user plane messages (e.g., SMS messages, emails, PIN messages, etc.) to report the logged MDT measurements to the network.

Figure 2:
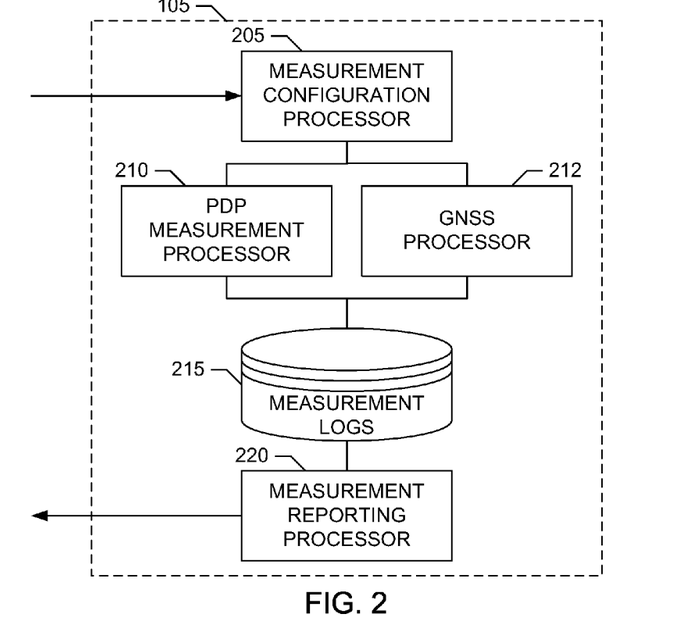
FIG. 2 is a block diagram of an example UE capable of limiting reporting of MDT neighbor cell measurements in the 3GPP communication system of FIG. 1 in accordance with the methods and apparatus described herein.

A block diagram of an example implementation of the UE 105 of FIG. 1 is illustrated in FIG. 2. FIG. 2 illustrates portions of the UE 105 associated with configuring and performing logged MDT measurements in accordance with the example methods and apparatus described herein. Those portions of the UE 105 associated with other functionality are omitted for clarity.

Turning to FIG. 2, the illustrated example implementation of the UE 105 includes an example measurement configuration processor 205 to receive, as described above and in further detail below, MDT measurement configuration information including one or more limits on the number of neighbor cells for which MDT measurements, such as periodic downlink pilot measurements, are permitted to be reported (e.g., also referred to as neighbor cell reporting limits), one or more offsets to be applied to the measurements and/or an RSSI indicator to indicate whether RSSI is to be measured along with the other configured periodic downlink pilot measurements. The UE 105 of FIG. 2 also includes an example periodic downlink pilot (PDP) measurement processor 210 to perform and log periodic downlink pilot measurements for neighbor cells in accordance with the neighbor cell reporting limits, offsets, RSSI indicator(s) and/or other configuration information received by the measurement configuration processor 205. Additionally, the UE 105 of FIG. 2 includes an example global navigation satellite system (GNSS) processor 212 (or similar processor) to perform location measurements in accordance with the MDT configuration information received by the measurement configuration processor 205. The UE 105 of FIG. 2 further includes measurement logging storage 215 to log (e.g., store in a particular format) MDT measurement(s) determined by the PDP measurement processor 210 and/or location measurements determined by the GNSS processor 212. The measurement logging storage 215 can be implemented using any type of memory or storage technology, such as the volatile memory 718 and/or the mass storage device 730 of the processing system 700 illustrated in FIG. 7, which is described in greater detail below. To report the MDT measurements and/or location measurements logged in the measurement logging storage 215, the UE 105 of FIG. 2 includes a measurement reporting processor 220. Example implementations and operation of the measurement configuration processor 205, the PDP measurement processor 210, the GNSS processor 212, the measurement logging storage 215 and the measurement reporting processor 220 are illustrated in subsequent figures and described in greater detail below.

Figure 3:
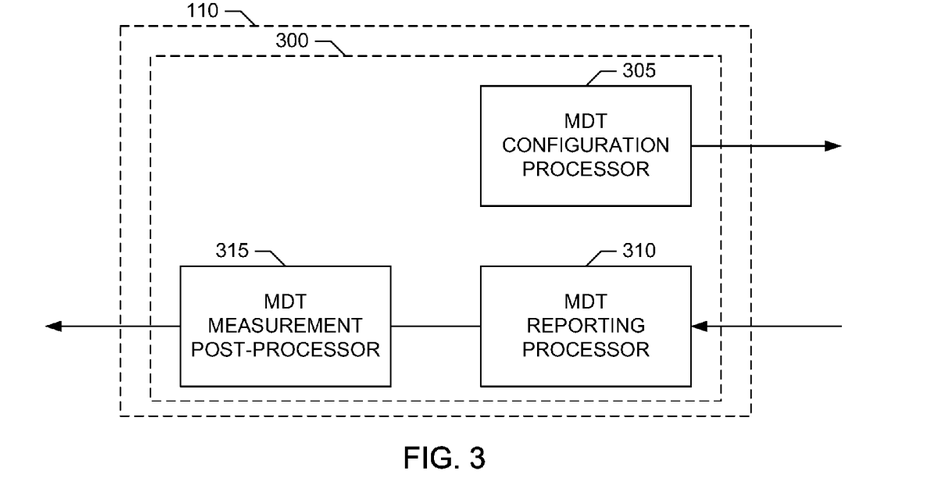
FIG. 3 is a block diagram of an example network element capable of enabling reporting limits for MDT neighbor cell measurements in the 3GPP communication system of FIG. 1 in accordance with the methods and apparatus described herein.

A block diagram of an example network element 300 that may be used by the cell 110 of FIG. 1 to configure and process MDT measurements is illustrated in FIG. 3. For example, the network element 300 can be implemented in or by a base station, such as a node-B or eNB, implementing the cell 110. Turning to FIG. 3, the network element 300 of the illustrated example includes an MDT configuration processor 305 to prepare and send MDT configuration information, including one or more neighbor cell reporting limits, offsets and RSSI indicator(s) described above and in greater detail below, to the UE 105. The network element 300 also includes an MDT reporting processor 310 to receive MDT measurement reports/logs from the UE 105 via, for example, measurement reporting, RRC signaling, etc. The network element 300 further includes an MDT measurement post-processor 315 to forward the MDT measurements/logs received from one or more UEs (e.g., including the UE 105) to a network operator for further processing. Example implementations and operation of the MDT configuration processor 305, the MDT reporting processor 310 and the MDT measurement post-processor 315 are illustrated in subsequent figures and described in greater detail below.

While example manners of implementing the UE 105 and the cell 110 of FIG. 1 have been illustrated in FIGS. 2-3, one or more of the elements, processes and/or devices illustrated in FIGS. 2-3 may be combined, divided, re-arranged, omitted, eliminated and/or implemented in any other way. Further, the example measurement configuration processor 205, the example PDP measurement processor 210, the example GNSS processor 212, the example measurement logging storage 215, the example measurement reporting processor 220, the example network element 300, the example MDT configuration processor 305, the example MDT reporting processor 310, the example MDT measurement post-processor 315 and/or, more generally, the example UE 105 of FIG. 2 and/or the example cell 110 of FIG. 3 may be implemented by hardware, software, firmware and/or any combination of hardware, software and/or firmware. Thus, for example, any of the example measurement configuration processor 205, the example PDP measurement processor 210, the example GNSS processor 212, the example measurement logging storage 215, the example measurement reporting processor 220, the example network element 300, the example MDT configuration processor 305, the example MDT reporting processor 310, the example MDT measurement post-processor 315 and/or, more generally, the example UE 105 and/or the example cell 110 could be implemented by one or more circuit(s), programmable processor(s), application specific integrated circuit(s) (ASIC(s)), programmable logic device(s) (PLD(s)) and/or field programmable logic device(s) (FPLD(s)), etc. In at least some example implementations, at least one of the example UE 105, the example cell 110, the example measurement configuration processor 205, the example PDP measurement processor 210, the example GNSS processor 212, the example measurement logging storage 215, the example measurement reporting processor 220, the example network element 300, the example MDT configuration processor 305, the example MDT reporting processor 310 and/or the example MDT measurement post-processor 315 are hereby expressly defined to include a tangible computer readable medium such as a memory, digital versatile disk (DVD), compact disk (CD), etc., storing such software and/or firmware. Further still, the example UE 105 of FIG. 2 and/or the example cell 110 of FIG. 3 may include one or more elements, processes and/or devices in addition to, or instead of, those illustrated in FIGS. 2-3, and/or may include more than one of any or all of the illustrated elements, processes and devices.

Figure 4:
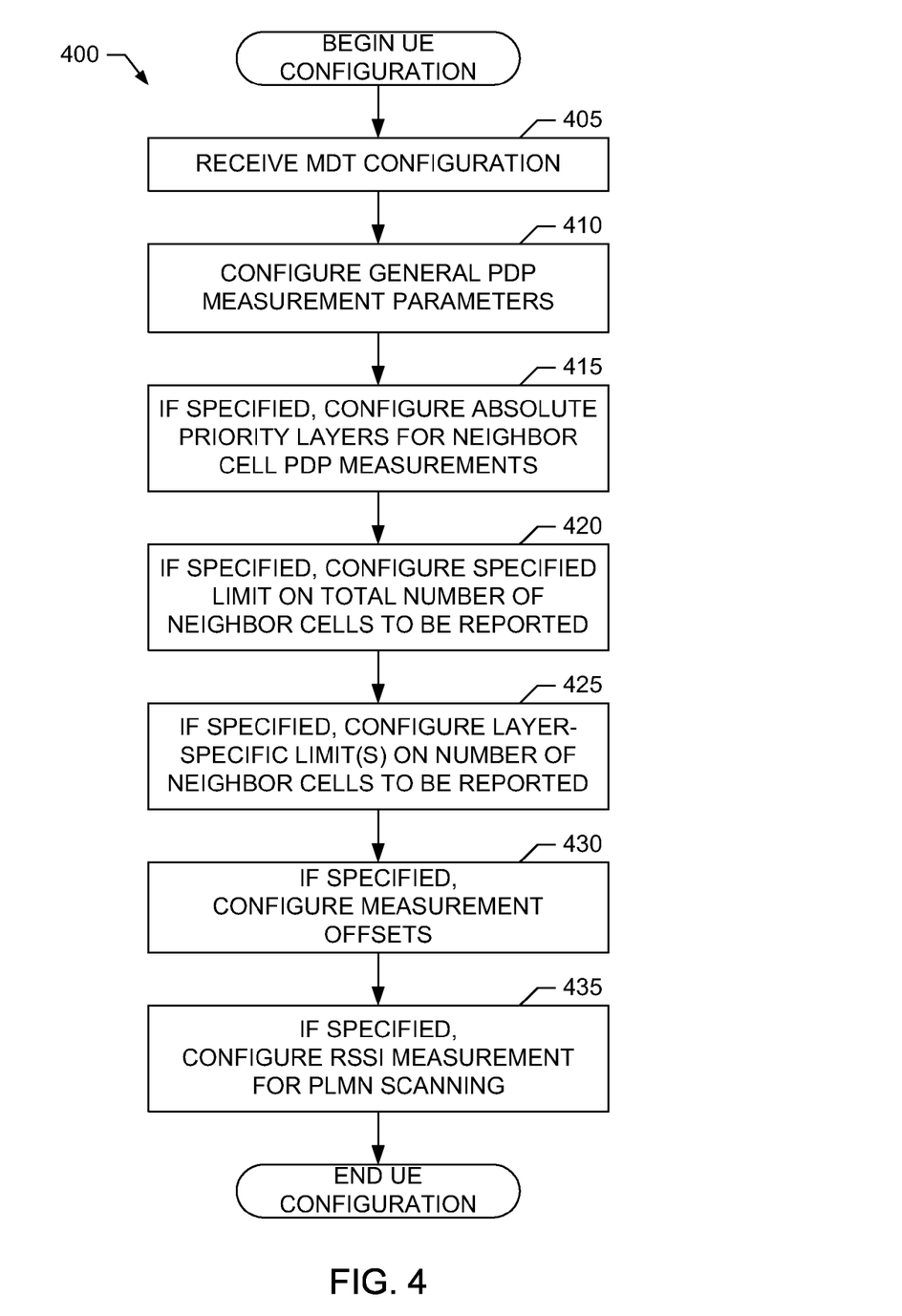
FIG. 4 is a flowchart representative of an example process that may be performed to configure the UE of FIG. 2 to limit reporting of MDT neighbor cell measurements.
Figure 5:
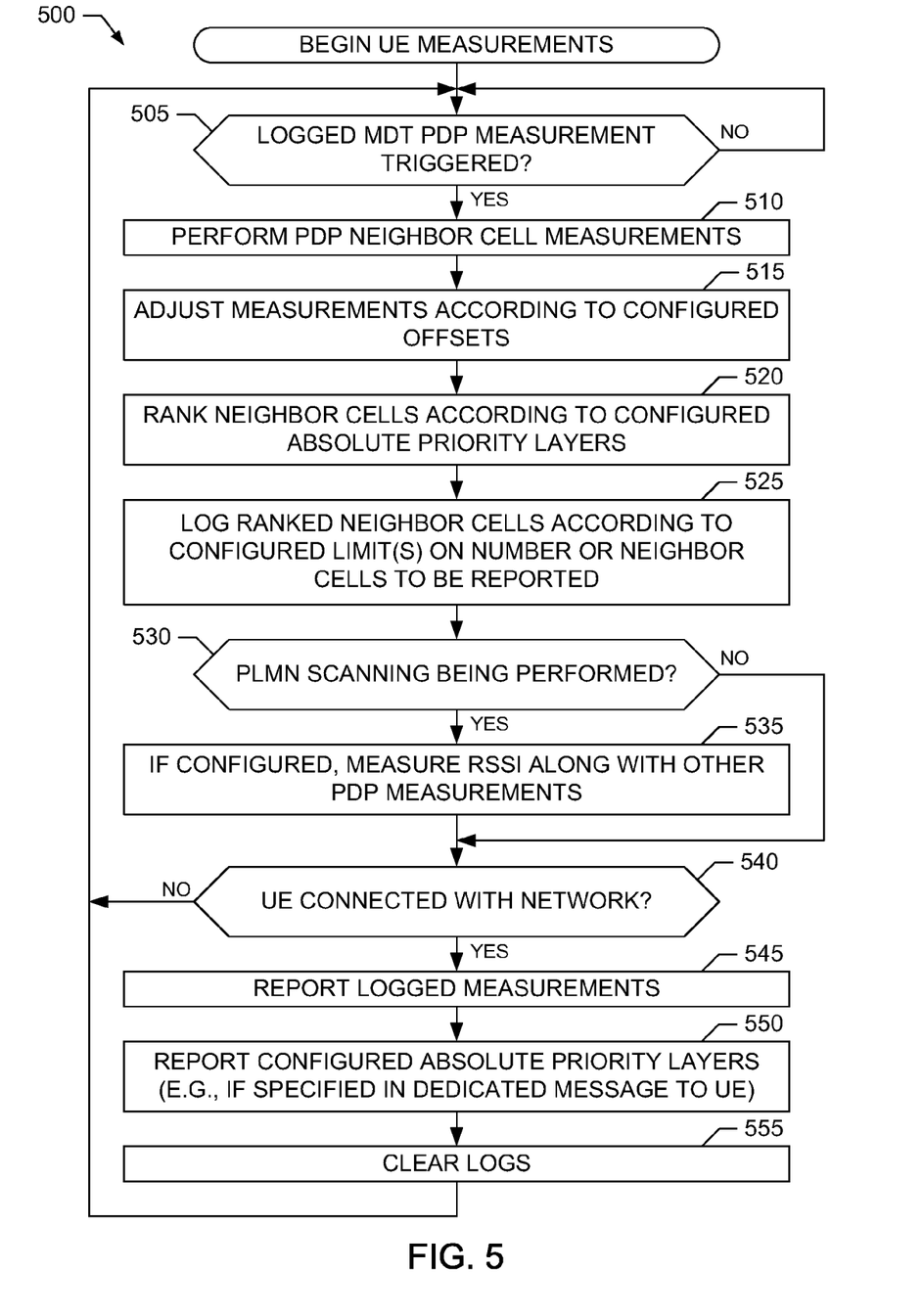
FIG. 5 is a flowchart representative of an example process that may be performed to implement limiting of MDT neighbor cell measurement reporting in the UE of FIG. 2.
Figure 6:
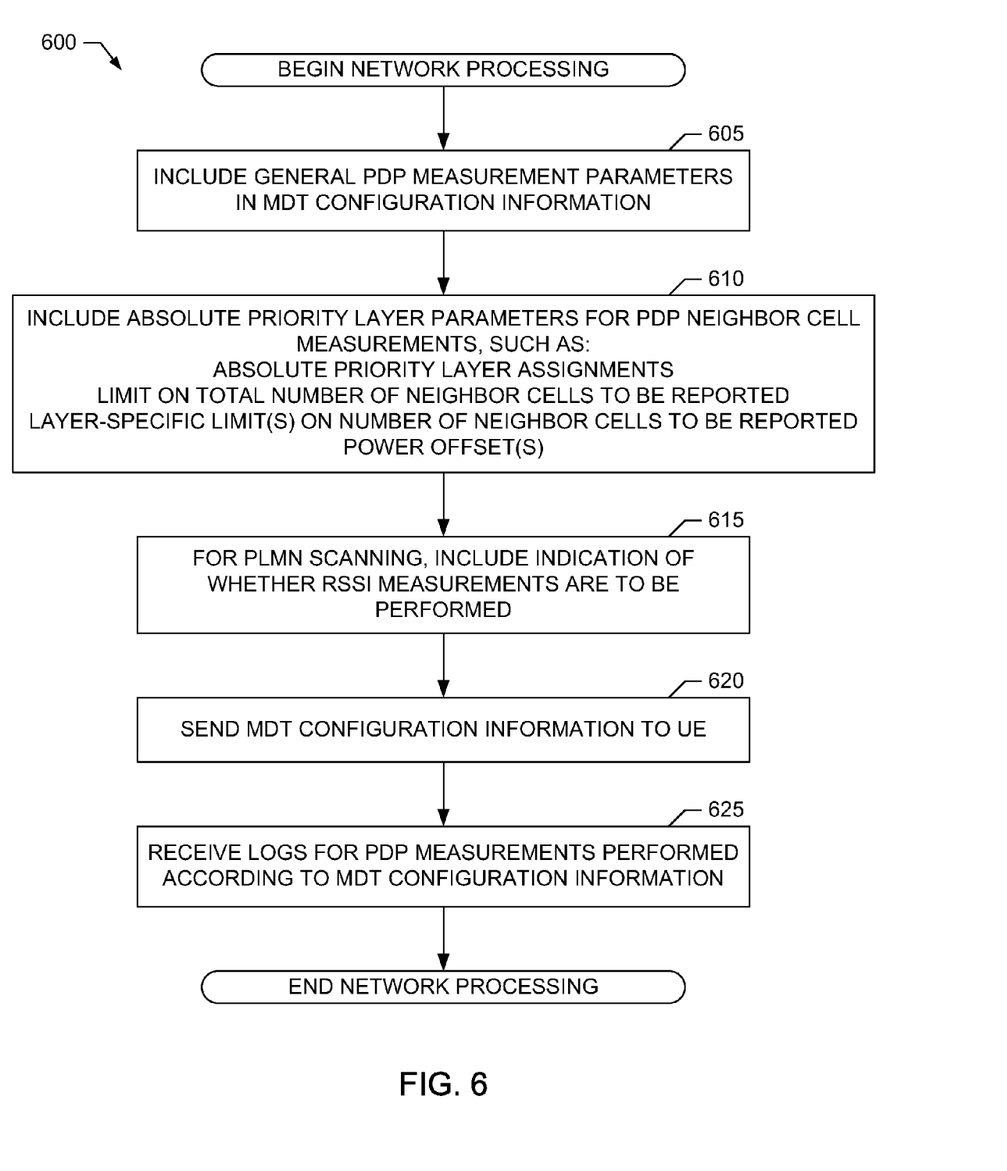
FIG. 6 is a flowchart representative of an example process that may be performed to implement MDT measurement configuration and processing in the network element of FIG. 3.

Flowcharts representative of example processes that may be executed to implement the example UE 105, the example cells 110-125, the example measurement configuration processor 205, the example PDP measurement processor 210, the example GNSS processor 212, the example measurement logging storage 215, the example measurement reporting processor 220, the example network element 300, the example MDT configuration processor 305, the example MDT reporting processor 310 and/or the example MDT measurement post-processor 315 are shown in FIGS. 4-6. In these examples, the process represented by each flowchart may be implemented by one or more programs comprising machine readable instructions for execution by a processor, such as the processor 712 shown in the example processing system 700 discussed below in connection with FIG. 7. Alternatively, the entire program or programs and/or portions thereof implementing one or more of the processes represented by the flowcharts of FIGS. 4-6 could be executed by a device other than the processor 712 (e.g., such as a controller and/or any other suitable device) and/or embodied in firmware or dedicated hardware (e.g., implemented by an ASIC, a PLD, an FPLD, discrete logic, etc.). Also, one or more of the processes represented by the flowchart of FIGS. 4-6, or one or more portion(s) thereof, may be implemented manually. Further, although the example processes are described with reference to the flowcharts illustrated in FIGS. 4-6, many other techniques for implementing the example methods and apparatus described herein may alternatively be used. For example, with reference to the flowcharts illustrated in FIGS. 4-6, the order of execution of the blocks may be changed, and/or some of the blocks described may be changed, eliminated, combined and/or subdivided into multiple blocks.

As mentioned above, the example processes of FIGS. 4-6 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 4-6 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

An example process 400 that may be executed to implement MDT measurement configuration in the UE 105 of FIGS. 1-2 is illustrated in FIG. 4. With reference to the preceding figures, the process 400 of FIG. 4 begins execution at block 405 at which the measurement configuration processor 205 included in the UE 105 receives MDT configuration information from its serving cell 110 via control plane signaling and/or user plane signaling, as described above. At block 410, the measurement configuration processor 205 configures any general periodic downlink pilot measurement parameters, such as the measurement periodicity, included in the MDT configuration information received at block 405. At block 415, the UE 105 configures any absolute priority layers for cell reselection. For example, in networks supporting absolute priority layers, each frequency or group of frequencies, and each RAT, can be a layer for which an absolute priority is specified. The absolute priority of a particular cell is then determined by the absolute priority layer (e.g., frequency and/or RAT) to which it belongs. The absolute priority configuration information configured at block 415 can be received in system information broadcast generally throughout the cell 110, and/or in a dedicated message sent to the UE 105. Additionally or alternatively, absolute priority configuration information can be included in the MDT configuration information received at block 405 and used by the measurement configuration processor 205 to configure one or more absolute priority layers for MDT measurement purposes (e.g., even though the UE 105 is not configured to use absolute priority for cell reselection).

At block 420, the measurement configuration processor 205 configures an upper limit on a total number of neighbor cells (e.g., among all absolute priority layers, if configured) for which periodic downlink pilot measurements are permitted to be reported, if such a limit is included in the MDT configuration information received at block 405. At block 425, the measurement configuration processor 205 configures any upper limit(s) on neighbor cell measurement reporting that are related to absolute priority layers, if such limit(s) are included in the MDT configuration information received at block 405. For example, the MDT configuration information can include one or more upper limits, each such upper limit associated with a respective, specified absolute priority layer and specifying a maximum number of cells in the specified absolute priority layer for which periodic downlink pilot measurements are permitted to be reported. Additionally or alternatively, the MDT configuration information can include one or more of (1) a first upper limit to specify a first number of neighbor cells (e.g., NH), among all absolute priority layers having higher priority than an absolute priority layer of the serving cell 110 of the UE 105, for which periodic downlink pilot measurements are permitted to be reported; (2) a second upper limit on a second number of neighbor cells (e.g., NL), among all absolute priority layers having lower priority than the absolute priority layer of the serving cell 110 of the UE 105, for which periodic downlink pilot measurements are permitted to be reported; and/or (3) a third upper limit on a third number of neighbor cells (e.g., NE), among all absolute priority layers having priority equal to the absolute priority layer of the serving cell 110 of the UE 105, for which periodic downlink pilot measurements are permitted to be reported.

At block 430, the measurement configuration processor 205 configures any measurement offset(s) included in the MDT configuration information received at block 405 and to be applied to periodic downlink pilot measurements for specified cell(s). For example, one or more cells in a network may correspond to pico, femto or relay cells transmitting at lower power than co-located macro cells. In such examples, an offset may be specified and associated with a particular cell identity (or type or class of cell), with the offsets to be added to the periodic downlink pilot measurements for the cell prior to ranking and logging in accordance with any specified neighbor cell reporting limits. At block 435, the measurement configuration processor 205 configures periodic downlink pilot measurements to include RSSI measurements, if an indication to perform RSSI measurements is included in the MDT configuration information received at block 405. Execution of the example process 400 then ends.

An example process 500 that may be executed to implement MDT measurement processing in the UE 105 of FIGS. 1-2 is illustrated in FIG. 5. With reference to the preceding figures, the process 500 of FIG. 5 begins execution at block 505 at which the PDP measurement processor 210 included in the UE 105 determines whether periodic downlink pilot measurements have been triggered (e.g., based on expiration of a timer having a measurement period specified by previously received MDT configuration information). If periodic downlink pilot measurements have been triggered (block 505), then at block 510 the PDP measurement processor 210 performs or obtains (e.g., from existing measurements already taken for cell reselection evaluation) any configured periodic downlink pilot measurements (e.g., such as RSCP, RSRP, etc.) for neighbor cells detectable by the UE 105. At block 515, the PDP measurement processor 210 adjusts the measurements determined at block 510 by any configured offsets for any specified neighbor cells (e.g., based on previously received MDT configuration information). At block 520, the PDP measurement processor 210 ranks the neighbor cells, based on the values of their respective downlink pilot measurements (adjusted by any offsets), according to any configured absolute priority layers. At block 525, the PDP measurement processor 210 logs the measurements in the measurement logging storage 215 for the ranked neighbor cells according to any configured upper limit(s) on the number of neighbor cells to be reported. The absolute priorities and cell identities for the neighbor cells whose measurements are logged can also be stored in the measurement logging storage 215 for later reporting.

For example, at blocks 520 and 525, the PDP measurement processor 210 can rank (if needed) all evaluated neighbor cells based on the values of their respective downlink pilot measurements and regardless of any configured absolute priority layers, and then log the measurements for the top ranked neighbor cells up to a configured upper limit on the total number of neighbor cells for which periodic downlink pilot measurements are permitted to be reported. Ranking may not need to be performed if no offsets have been specified and the measurements have already been ranked as part of the UE's cell reselection evaluation processing. As another example, at blocks 520 and 525, the PDP measurement processor 210 can rank the evaluated neighbor cells in a particular absolute priority layer based on the values of their respective downlink pilot measurements, log the measurements for the top ranked neighbor cells up to a configured upper limit on the total number of neighbor cells in the particular absolute priority layer for which periodic downlink pilot measurements are permitted to be reported, and then repeat this procedure for neighbor cells in one or more, or all, other configured absolute priority layer. In yet another example, at blocks 520 and 525, the PDP measurement processor 210 can rank the evaluated neighbor cells, based on the values of their respective downlink pilot measurements, in all absolute priority layers having higher priority than the priority of the serving cell 110, and log the measurements for the top ranked neighbor cells up to a configured upper limit on the total number of neighbor cells, among all absolute priority layers having higher priority than an absolute priority layer of the serving cell 110 of the UE 105, for which periodic downlink pilot measurements are permitted to be reported. Additionally or alternatively, at blocks 520 and 525, the PDP measurement processor 210 can rank the evaluated neighbor cells, based on the values of their respective downlink pilot measurements, in all absolute priority layers having lower priority than the priority of the serving cell 110, and log the measurements for the top ranked neighbor cells up to a configured upper limit on the total number of neighbor cells, among all absolute priority layers having lower priority than an absolute priority layer of the serving cell 110 of the UE 105, for which periodic downlink pilot measurements are permitted to be reported. Additionally or alternatively, at blocks 520 and 525, the PDP measurement processor 210 can rank the evaluated neighbor cells, based on the values of their respective downlink pilot measurements, in all absolute priority layers having equal priority to that of the serving cell 110, and log the measurements for the top ranked neighbor cells up to a configured upper limit on the total number of neighbor cells, among all absolute priority layers having equal priority to the serving cell 110 of the UE 105, for which periodic downlink pilot measurements are permitted to be reported.

At block 530, the PDP measurement processor 210 determines whether PLMN scanning is being performed. If PLMN scanning is performed (block 530), then at block 535 the PDP measurement processor 210 measures RSSI, if RSSI measurement was configured by the received MDT configuration information, in addition to any other configured period downlink pilot measurements (e.g., RSCP, RSRP, etc.).

At block 540, the UE 105 determines whether it has entered connected mode and a radio link has been established with its serving cell 110. If the UE 105 is in connected mode (block 540), then at block 545 the measurement reporting processor 220 included in the UE 105 reports the MDT measurements logged in the measurement logging storage 215 (e.g., via control plane signaling, user plane messages, etc.), as described above. At block 550, the measurement reporting processor 220 also reports any configured absolute priority layers. For example, if the UE 105 received absolute priority layer configuration information via dedicated signaling, the network may not retain the absolute priority layer configuration for this particular UE 105. Thus, at block 550 the absolute priority layers configured in the UE 105 are reported to enable proper interpretation of the MDT measurements reported at block 545. Then, at block 555 the UE 105 clears the logs stored in the measurement logging storage 215, and the example process 500 repeats.

An example process 600 that may be executed to implement MDT measurement configuration and processing in the serving cell 110 of FIGS. 1 and 3 is illustrated in FIG. 6. With reference to the preceding figures, the process 600 of FIG. 6 begins execution at block 605 at which the MDT configuration processor 305 included in the network element 300 implementing the cell 110 includes any general periodic downlink pilot measurement configuration information, such as the measurement periodicity, in the MDT configuration information to be sent to the UE 105. At block 610, the MDT configuration processor 305 includes any configuration parameters related to absolute priority layers, such as one or more of the neighbor cell reporting limits and/or offsets described above, as well as any configuration of absolute priority layer assignments themselves, in the MDT configuration information. At block 615, the MDT configuration processor 305 includes an indication in the MDT configuration information to indicate whether RSSI is to be measured during PLMN scanning.

Next, at block 620, the MDT configuration processor 305 sends the MDT configuration information to the UE 105. For example, the MDT configuration processor 305 can send the MDT configuration information to the UE 105 using control plane signaling (e.g., via one or more RRC messages) and/or user plane messages (e.g., SMS messages, emails, PIN messages, etc.). Sometime later, at block 625, the MDT reporting processor 310 included in the network element 300 implementing the cell 110 receives MDT measurement logs from the UE 105 that were generated in accordance with the MDT configuration information sent at block 620. For example, the MDT reporting processor 310 can received the MDT measurement reports from the UE 105 using control plane signaling (e.g., via one or more RRC messages) and/or user plane messages (e.g., SMS messages, emails, PIN messages, etc.).

In yet another example, neighbor cell measurement reporting for MDT can be limited by specifying the MDT measurement configuration to include configuration of the measurements to be logged, such as the measurement object (frequency), its priority and the maximum number of cells from the measurement object which can be logged. In such an example, the measurement quantity is fixed for logged MDT and consists of both RSRP and RSRQ for E-UTRAN, both RSCP and Ec/No for UTRAN and Rxlev for GERAN. In the preceding example, the term "measurement object" corresponds to "absolute priority layer" as used previously herein.

Figure 7:
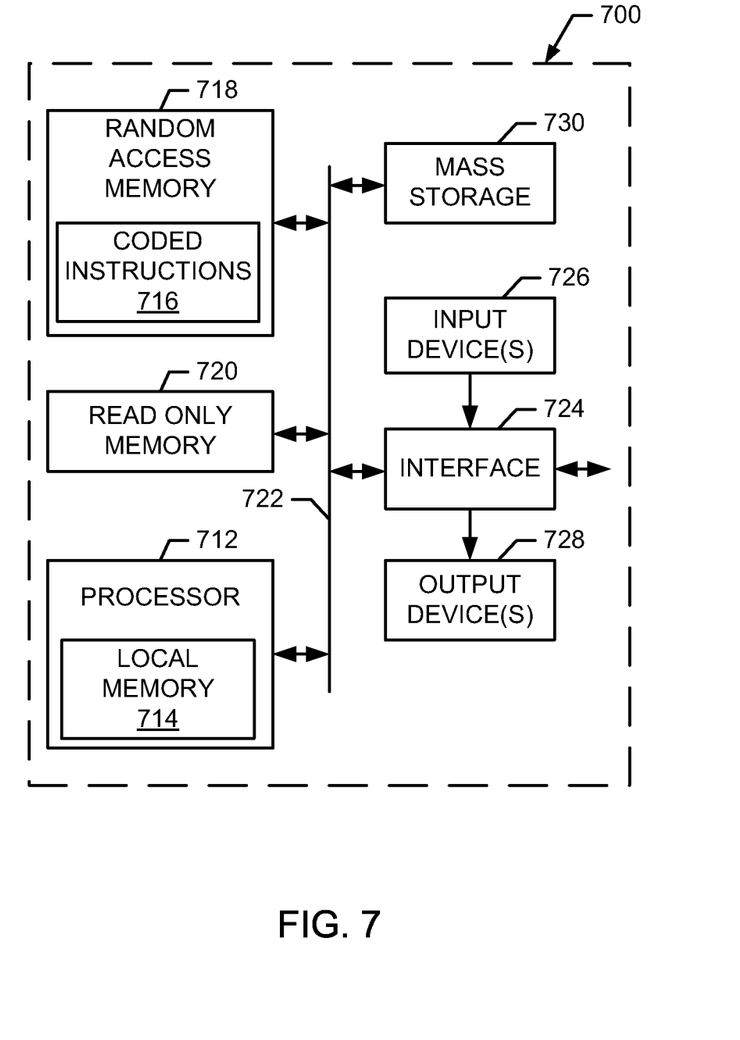
FIG. 7 is a block diagram of an example processing system that may execute example machine readable instructions used to implement some or all of the processes of FIGS. 4-6 to implement the UE of FIG. 2, the network element of FIG. 3 and/or the 3GPP communication system of FIG. 1.

FIG. 7 is a block diagram of an example processing system 700 capable of implementing the apparatus and methods disclosed herein. The processing system 700 can be, for example, a server, a personal computer, a personal digital assistant (PDA), a smartphone, an Internet appliance, a DVD player, a CD player, a digital video recorder, a personal video recorder, a set top box, or any other type of computing device.

The system 700 of the instant example includes a processor 712 such as a general purpose programmable processor. The processor 712 includes a local memory 714, and executes coded instructions 716 present in the local memory 714 and/or in another memory device. The processor 712 may execute, among other things, machine readable instructions to implement the processes represented in FIGS. 4-6. The processor 712 may be any type of processing unit, such as one or more Intel® microprocessors from the Pentium® family, the Itanium® family and/or the XScale® family, one or more microcontrollers from the ARM® and/or PICO families of microcontrollers, etc. Of course, other processors from other families are also appropriate.

The processor 712 is in communication with a main memory including a volatile memory 718 and a non-volatile memory 720 via a bus 722. The volatile memory 718 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 720 may be implemented by flash memory and/or any other desired type of memory device. Access to the main memory 718, 720 is typically controlled by a memory controller (not shown).

The processing system 700 also includes an interface circuit 724. The interface circuit 724 may be implemented by any type of interface standard, such as an Ethernet interface, a universal serial bus (USB), and/or a third generation input/output (3GIO) interface.

One or more input devices 726 are connected to the interface circuit 724. The input device(s) 726 permit a user to enter data and commands into the processor 712. The input device(s) can be implemented by, for example, a keyboard, a mouse, a touchscreen, a track-pad, a trackball, an isopoint and/or a voice recognition system.

One or more output devices 728 are also connected to the interface circuit 724. The output devices 728 can be implemented, for example, by display devices (e.g., a liquid crystal display, a cathode ray tube display (CRT)), by a printer and/or by speakers. The interface circuit 724, thus, typically includes a graphics driver card.

The interface circuit 724 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 700 also includes one or more mass storage devices 730 for storing software and data. Examples of such mass storage devices 730 include floppy disk drives, hard drive disks, compact disk drives and digital versatile disk (DVD) drives. The mass storage device 730 may implement the measurement logging storage 215. Alternatively, the volatile memory 718 may implement the measurement logging storage 215.

As an alternative to implementing the methods and/or apparatus described herein in a system such as the processing system of FIG. 7, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for a wireless device to store measurements of neighboring cells in a mobile communication network, the method comprising:

processing, at the wireless device, configuration information for periodic downlink pilot measurements to be stored by the wireless device, the configuration information having an upper limit on a number of neighbor cells for which periodic downlink pilot measurements are permitted to be stored and reported, wherein the upper limit is a first upper limit on a first number of neighbor cells, among all absolute priority layers having higher priority than an absolute priority layer of a serving cell of the wireless device, for which periodic downlink pilot measurements are permitted to be reported, and wherein the configuration information is further associated with:

a second upper limit on a second number of neighbor cells, among all absolute priority layers having lower priority than the absolute priority layer of the serving cell of the wireless device, for which periodic downlink pilot measurements are permitted to be reported; and a third upper limit on a third number of neighbor cells, among all absolute priority layers having priority equal to the absolute priority layer of the serving cell of the wireless device, for which periodic downlink pilot measurements are permitted to be reported; and storing, at the wireless device, the periodic downlink pilot measurements in accordance with the configuration information.

2. A tangible machine readable storage medium comprising machine readable instructions which, when executed, cause a machine to at least:

process, at a wireless device in a mobile communication network, Configuration information for periodic downlink pilot measurements to be stored by the wireless device, the configuration information having an upper limit on a number of neighbor cells for which periodic downlink pilot measurements are permitted to be stored and reported, wherein the upper limit is a first upper limit on a first number of neighbor cells, among all absolute priority layers having higher priority than an absolute priority layer of a serving cell of the wireless device, for which periodic downlink pilot measurements are permitted to be reported, and wherein the configuration information is further associated with:

a second upper limit on a second number of neighbor cells, among all absolute priority layers having lower priority than the absolute priority layer of the serving cell of the wireless device, for which periodic downlink pilot measurements are permitted to be reported; and a third upper limit on a third number of neighbor cells, among all absolute priority layers having priority equal to the absolute priority layer of the serving cell of the wireless device, for which periodic downlink pilot measurements are permitted to be reported; and store, at the wireless device, the periodic downlink pilot measurements in accordance with the configuration information.

3. An apparatus to perform measurements in a mobile communication network, the apparatus comprising:

a processor to:

process, at a mobile station in the mobile communication network, configuration information for periodic downlink pilot measurements to be stored by the mobile device, the configuration information having an upper limit on a number of neighbor cells for which periodic downlink pilot measurements are permitted to be stored and reported; and store, at the mobile station, the periodic downlink pilot measurements in accordance with the configuration information wherein the upper limit is a first upper limit on a first number of neighbor cells, among all absolute priority layers having higher priority than an absolute priority layer of a serving cell, for which periodic downlink pilot measurements are permitted to be reported, and wherein the configuration information is further associated with:

a second upper limit on a second number of neighbor cells, among all absolute priority layers having lower priority than the absolute priority layer of the serving cell of the wireless device, for which periodic downlink pilot measurements are permitted to be reported; and a third upper limit on a third number of neighbor cells, among all absolute priority layers having priority equal to the absolute priority layer of the serving cell of the wireless device, for which periodic downlink pilot measurements are permitted to be reported; and a memory to store the periodic downlink pilot measurements.

4. An apparatus as defined in claim 3 wherein the configuration information further includes absolute priority layer configuration information, and wherein the memory is to store the absolute priority layer configuration information.

5. An apparatus as defined in claim 3 wherein the configuration information further includes an offset to adjust periodic downlink pilot measurements associated with a specified neighbor cell.

6. An apparatus as defined in claim 3 wherein the configuration information further includes an indication indicating whether received signal strength indication (RSSI) is to be measured when periodic downlink pilot measurements are performed during public land mobile network (PLMN) scanning, and wherein the processor is to log at least one of an RSSI measurement, a frequency, a PLMN identity or a list of cell identities for a detected PLMN if the indication indicates RSSI is to be measured.

7. A method as defined in claim 1 wherein the configuration information further includes absolute priority layer configuration information.

8. A method as defined in claim 1 wherein the configuration information further includes an offset to adjust periodic downlink pilot measurements associated with a specified neighbor cell.

9. A method as defined in claim 1 wherein the configuration information further includes an indication indicating whether received signal strength indication (RSSI) is to be measured when periodic downlink pilot measurements are performed during public land mobile network (PLMN) scanning, and wherein the method further comprises logging at least one of an RSSI measurement, a frequency, a PLMN identity or a list of cell identities for a detected PLMN if the indication indicates RSSI is to be measured.

10. A method as defined in claim 1 wherein storing the periodic downlink pilot measurements in accordance with the configuration information comprises logging periodic downlink pilot measurements according to the upper limit on the number of neighbor cells.

11. A tangible machine readable storage medium as defined in claim 2 wherein the configuration information further includes an offset to adjust periodic downlink pilot measurements associated with a specified neighbor cell.

* * * * *